United States Patent [19]

Camlibel et al.

[11] 4,240,716
[45] Dec. 23, 1980

[54] ELECTRODEPOSITION DISPLAY DEVICE

[75] Inventors: Irfan Camlibel, Stirling; Shobha Singh, Summit; LeGrand G. Van Uitert, Morristown; George J. Zydzik, Columbia, all of N.J.

[73] Assignee: Bell Telephone Laboratories, Incorporated, Murray Hill, N.J.

[21] Appl. No.: 969,773

[22] Filed: Dec. 15, 1978

[51] Int. Cl.³ .............................................. G02F 1/29
[52] U.S. Cl. ................................................... 350/363
[58] Field of Search ......................................... 350/363

*Primary Examiner*—William L. Sikes
*Assistant Examiner*—Leon Scott, Jr.
*Attorney, Agent, or Firm*—Walter G. Nilsen

[57] ABSTRACT

An electrodeposition display device is described which uses an electrolyte containing silver species and certain anion species including iodide and bromide. The electrolyte also contains an opacifier made up of solid semiconductor substance and solid insulator substance. Such display devices have high contrast, large viewing angle and a pleasing variety of colors including blue, red and brown.

20 Claims, 1 Drawing Figure

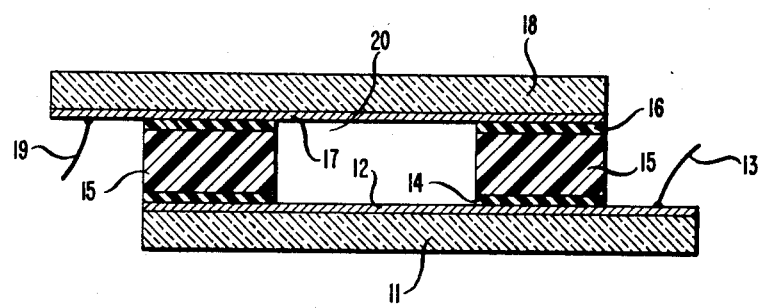

ELECTRODEPOSITION DISPLAY DEVICE

TECHNICAL FIELD

The invention is a display device which operates by electroplating material contiguous to a transparent conducting surface.

BACKGROUND OF THE INVENTION

Recent interest in display systems has been extensive principally because of the development of various integrated circuit devices such as calculators, watches, microprocessors, etc. These devices and other similar devices process or store information which often requires rapid and frequent reading. Particularly desirable in such display systems are low power consumption, good visibility (high contrast and large viewing angle) and low cost. Various systems are useful in display devices including ferroelectric ceramics, liquid crystals and various electric systems, such as electrochemichromic systems. Other display systems include plasma discharge panels and light emitting diodes. Although these systems may be satisfactory for some applications, the need remains for more versatile display systems with better visibility and lower cost. Display devices may also be used as light modulators as described in a reference by J. Mantell and S. Zaromb, *Journal of the Electrochemical Society*, 109 (1962) pages 992-993. A display system of interest has been described by J. P. Della Mussia, *Mesures-Regulation-Automatisme* (France), Vol. 42, No. 5, May 1977, pages 43-44. This reference describes an alternate method of making a display system using a silver plating solution.

SUMMARY OF THE INVENTION

The invention is a versatile electrodeposition display system in which the active electrolyte contains, in addition to silver and iodine and/or bromine ions (e.g., in the form of silver bromide and/or iodide), a mixed opacifier. This mixed opacifier is made up of both semiconducting substance and insulator substance. This combination of materials in the mixed opacifier permits dispersion effects that yield high contrast ratio without the use of high operating voltages. Low operating voltage is advantageous because it saves energy, reduces heat dissipation problems, and increases device reliability and lifetimes, because of reduced generation of free iodine and reduced electrochemical decomposition of solvent.

BRIEF DESCRIPTION OF THE DRAWING

The FIGURE shows a sectioned side view of an electrodeposition display device made in accordance with the invention.

DETAILED DESCRIPTION

In its broadest aspects, the invention is an electrodeposition display device in which the active material (generally a paste) from which the substance is electrodeposited contains an organic solvent, a silver containing substance, at least partially dissolved in the organic solvent, and a mixed opacifier. Particular attention is paid to the constitution of the opacifier since it leads to low operating voltage, high contrast and high optical density.

In essence, the opacifier is made up of two solid substances, one a semiconducting substance and one an insulating substance. These substances should be stable to the environment of the display device, particularly the driving voltage.

A large variety of substances may be used as the semiconducting substance including the doped counterpart of various insulating substances, such as $TiO_2$, $Ta_2O_5$, $Nb_2O_5$. Either p-type or n-type may be used. Suitable semiconducting substances, preferably, should have conductivities of at least $10^{-9}$ mhos/cm under an applied voltage at room temperature. Higher conductivities are preferred because of more rapid switching of the display and greater contrast of the display. Typical higher conductivities are at least $10^{-8}$ mhos/cm or even at least $10^{-7}$ mhos/cm. Higher conductivities up to about one mhos/cm are also very useful. Conductivities often vary with applied voltage perhaps due to surface charge states. Upon injection of electrons during the application of voltage, the semiconductor often becomes lightly colored, increasing its conductivity. This change is not observed in the silver containing display as deposition occurs at the same time. This color disappears on voltage reversal, leaving the background clear. The semiconducting substance should also preferably be white or light colored to provide maximum contrast with the electroplated substance making up the display. The semiconducting substance should be insoluble in the electrolyte and not be irreversibly affected by the conditions (voltage, electrode action, etc.) of the display device.

The insulating substance should preferably be white or light in color in order to provide maximum contrast with the substance plating out during operation of the display device. It should also be inert to the chemical and physical conditions of the display device, as described above, and preferably be sufficiently reflective to enhance the contrast for the display.

The concentration of semiconductor and insulator substances in the opacifier may vary over large limits and still provide excellent device performance. Preferred concentrations often depend on the properties of semiconductor used, the particular semiconductor substances used, and the properties and identity of insulator substance used. Preferred concentration ranges for typical semiconductor and insulator substances are 1 to 90 weight percent semiconductor remainder insulator. Better results are obtained using a concentration range from 20 to 70 weight percent semiconductor, remainder insulator, particularly for 4A molecular sieve and $Al_2O_3$ or mixtures of these two insulator substances. Best results are obtained using 30 to 40 weight percent semiconductor, remainder insulator substance.

Small particle size is also highly advantageous because of the increased dispersion of the deposits, its fineness and the resolution of the display. Particle sizes less than five microns are preferred. Generally, semiconductor substances and insulator substances have a range of particle sizes. For the display systems described here, it is preferred that the average particle size is less than five microns. Still smaller particle sizes are advantageous where obtainable in a suitable semiconductor or insulator substance. For example, for either semiconductor or insulator substance, average particle size less than one micron is preferred. Average particle size less than one-tenth of a micron is even more preferred.

A large variety of materials may be used as the semiconducting substance including mixtures of various substances. High optical index of refraction is preferred because of greater reflecting characteristics which increase the optical contrast of the display device. Preferred are uncolored transition-metal oxides such as $TiO_2$, $ZrO_2$, $Nb_2O_5$ and other compounds containing Ti, Zr, Nb and Ta. Transition metals are metals with partially filled d shells. These substances should contain impurities or dopants to make them semiconducting. The selection of impurity depends on the basic substance chosen. For example, the valence of the impurity or dopant cation should either be less than (for p-type semiconductor) or greater than (for n-type semiconductor) the cation of the basic substance. Also, the ionic radius of the impurity cation should be approximately the same as the cation of the basic substance.

A table of cations suitable for impurity doping in basic substances is given below for six coordination environments:

| Cation | $M^{2+}$ | Be | Ni | Mg | Zn | Fe | | | | |
|---|---|---|---|---|---|---|---|---|---|---|
| Radius | | .45 | .69 | .72 | .74 | .78 | | | | |
| Cation | $M^{3+}$ | Al | As | Ni | Co | Cr | Fe | Mn | Sc | Sb | In |
| Radius | r | .535 | .58 | .60 | .61 | .615 | .645 | .645 | .745 | .76 | .80 |
| Cation | $M^{4+}$ | Si | Ti | Ge | Zr | Sn | Hf | | | | |
| Radius | r | .40 | .605 | .53 | .72 | .69 | .71 | | | | |
| Cation | $M^{5+}$ | P | V | As | Nb | Sb | Ta | | | | |
| Radius | r | .38 | .54 | .46 | .64 | .60 | .64 | | | | |
| Cation | $M^{6+}$ | Mo | W | | | | | | | | |
| Radius | r | .59 | .60 | | | | | | | | |
| Cation | $M^{7+}$ | Re | | | | | | | | | |
| Radius | r | .53 | | | | | | | | | |

Although the impurity concentration in the semiconductor substance may vary over large limits, particularly good results are obtained in the range of 0.001 to 1.0 weight percent. For typical semiconductors, best results are obtained in the range from 0.005 to 0.025 weight percent.

A particular good and low cost semiconductor material is reagent grade $TiO_2$. This grade $TiO_2$ has sufficient impurities to make it semiconducting. Various impurities may be used as described above. A particularly effective impurity is iron in the concentration range of 0.005 to 0.025 weight percent.

Various insulating substances may be used provided they are insoluble and inert to the conditions of the display device. Again, high reflectivity and white or light color is desirable to increase light reflection and insure good optical contrast. Typical insulating substances are BeO, MgO, ZnO, $Al_2O_3$, $Ga_2O_3$, $Sc_2O_3$, $Y_2O_3$, $La_2O_3$, $Gd_2O_3$, $SiO_2$, $GeO_2$, and mixed oxide compounds of the above such as $BeAl_2O_4$, $ZnGa_2O_4$, $MgAl_2O_4$ $Be_3Al_2Si_3O_{12}$, $GdAlO_3$, etc. Also useful are insoluble mixed-oxide compounds containing alkali-metal ions. Typical examples are $NaAlSi_2O_6$ and $NaYO_2$. Transition-metal oxides may also be used provided they are insoluble and do not contain impurities which make them semiconducting. Typical examples are $TiO_2$, $BaTiO_3$, $ZrO_2$ $KTaO_3$, etc.

Particularly good results are obtained by the use of alkali-metal alumino silicates (zeolites commercially known as molecular sieves) because of small particle size. Such substances are readily available and inexpensive. Such substances may offer other advantages such as absorption of water inadvertently entering the display device and absorption of gas products. These properties increase device lifetime. The compound $NaAlSi_2O_8$ (commercially known as 4A molecular sieve) is preferred because of small particle size and easy availability. Mixtures of compounds are often useful as the insulator substance. A typical example is $NaAlSi_2O_8$ and $Al_2O_3$. For $TiO_2$ as the semiconductor substance and $NaAlSi_2O_8$ as the insulator substance, a concentration range from 30 to 70 weight percent semiconductor remainder insulating substance shows excellent results.

Useful opacifier compositions are as follows:
a. 1 gm $TiO_2$—2 gm 4A molecular sieve.
b. 1 gm $TiO_2$—1 gm 4A sieve—1 gm $Al_2O_3$.
c. 1 gm $TiO_2$—1 gm 4A sieve—4 gm $Al_2O_3$.
d. 1 gm $TiO_2$—2 gm $Al_2O_3$.

The active elements in a reversible electrodeposition display (often abbreviated RED for convenience) are solvent and a soluble silver containing compound.

A large variety of solvents are useful in the display device. Preference is given to solvents that are stable to the chemical and physical conditions present in the display device. In particular, it should not decompose under influence of the voltages used in the device nor react destructively with the other ingredients in the display device. It should provide good solubility for silver-anion complexes (i.e., $Ag_3I_4^-$, $Ag_4I_5^-$, $Ag_2I_3^-$, $AgI_6^-$, $AgBr_2^-$, $AgCl_2$, etc.) and preferably have a large liquid range above and below room temperature (preferably melting point less than $-40°$ C. and boiling point greater than $120°$ C.).

Good solubility for the complexes mentioned above is particularly advantageous because more material plates out with less voltage. This permits more rapid operation, with lower power consumption and much greater contrast in the display.

The solvent should not easily give up protons (it should exhibit a very low concentration of protons) so as to prevent deterioration of contacts by reducing protons to elemental hydrogen. Proton concentrations should be in the order of magnitude less than even strangely basic water. It is preferred that the pKa value should be greater than 9 and more preferably greater than 12.

Typical solvents are dimethyl and diethyl sulfoxide, N,N-dimethyl and N,N-diethyl formamide, acetonitrile, diethyl malanate, ethyl acetoacetic ester, ketones, esters, ethers and alcohols with high pKa values. Also useful are organic carbonates such as propylene carbonate, organic lactones, organic nitriles, nitrohydrocarbons, etc.

The solvents dimethylsulfoxide and N,N-dimethyl formamide are preferred because of high solubility for the silver-anion complexes and stability. One of these solvents (dimethylsulfoxide) has the disadvantage of a high melting point, namely $18°$ C., but the advantage of great solubility for the silver-anion complex. This solvent is preferred only when the temperature of operation does not fall below $18°$ C. Mixed solvents may be used (i.e., a mixture of dimethylsulfoxide and N,N-dimethyl formamide) to obtain the advantage of high solubility and to lower the melting point to extend the temperature of operation.

In addition to solvent, the electrolyte should preferably contain silver compound and either iodide or bromide compound. A variety of silver compounds may be used, provided they yield solutions of silver-containing ions. Generally, it is most convenient to add silver iodide or silver bromide because of convenience.

Either iodide or bromide may be used as the anion. These ions may be introduced in the form of alkali metal iodide, or bromide salts. Ammonium iodide or ammonium bromide salts are also useful. Mixtures of bromides and iodides also give excellent results.

Excess iodide or bromide is useful when it is desired to shorten the persistence of the display. This results in a faster display system. A deficiency is desirable when long persistence is required. For convenience, the silver and halide is added as AgI or AgBr and the excess halide is added as halide salt (i.e., LiI, RbI, LiBr, NH$_4$I, etc.). Mixtures of AgI and AgBr, as well as mixtures of halide salts (i.e., LiI, LiBr) are used.

Concentration of AgI may range from approximately 0.001 gms per gm of electrolyte to saturation. Below 0.001 gms AgI per gm electrolyte, the voltage necessary to electrodeposit sufficient material for good display is excessive. Preferred concentration range is from 0.01 gms AgI per gm electrolyte to one-third the saturation concentration of AgI. Similar concentration ranges apply to AgBr and mixtures of AgI and AgBr. The lower concentration limit ensures sufficient electrodeposition for good display characteristics without excessive voltage or periods of time required for plating. The upper limit is to avoid unwanted deposits which deteriorate device performance and can cause shorts. Without this limitation, higher concentration would be preferred because it gives displays with greater contrast at lower voltages and shorter periods of time.

A particular advantage of this display system is the pleasing variety of colors that can be obtained by using various voltages and electrolyte compositions. For example, blue colors can be obtained by using bromides rather than iodides in the electrolyte and red to brown colors can be obtained by using iodides of various concentrations and various driving voltages. Typical cell compositions are given below:

| Example 1 | |
|---|---|
| dimethylsulfoxide | 1.612 gms |
| AgI | 0.584 gms |
| LiI | 0.114 gms |
| Al$_2$O$_3$ | 0.60 gms |
| semiconducting TiO$_2$ | 0.05 gms |
| Example 2 | |
| N,N dimethylformamide | 0.587 gms |
| AgI | 0.173 gms |
| RbI | 0.050 gms |
| LiBr | 0.020 gms |
| Al$_2$O$_3$ | 0.40 gms |
| semiconductor TiO$_2$ | 0.0026 gms |
| Example 3 | |
| N,N dimethylformamide | 0.226 gms |
| AgBr | 0.064 gms |
| LiBr | 0.094 gms |
| Al$_2$O$_3$ | 0.128 gms |
| semiconducting TiO$_2$ | 0.0083 gms |
| Example 4 | |
| N,N dimethylformamide | 0.1150 gms |
| AgI | 0.0723 gms |
| NH$_4$I | 0.0127 gms |
| molecular sieve | 0.100 gms |
| *-continued* | |
| semiconducting TiO$_2$ | 0.050 gms |

Typical operating voltage is two volts. Pulse operation is often used, for example, one second pulses of 4 volts.

The reference cell may vary in structure depending on application and use. Generally, the reference cell consists of at least one transparent substrate (e.g., glass or plastic), which enclose a volume containing the active medium, often in the form of a paste. The second confining surface also may be a transparent substrate or it may be carbon, silver or other metal. Electrical contact with the active medium may be provided in a variety of ways, including transparent contacts (e.g., indium-tin oxide, SnO$_2$, etc.) mounted on the inside (side facing and in contact with the active medium) of the transparent substrates. Polarity is arranged so that electrodeposition occurs at least on the front or transparent face. The conducting material may be put down on the transparent substrates in predetermined shapes so as to form numbers, letters, etc. Various geometric shapes for producing figures, letters, numbers, etc. may also be used. A typical example is the seven segment alpha numeric display extensively used in display devices as calculators, watches, etc.

The invention is conveniently illustrated by a description of the figure. The figure shows an electrodeposition display device 10 made in accordance with the invention. It comprises a lower transparent glass substrate 11 a lower transparent electrical contact 12 made of indium-tin oxide and an electrical connection 13 to the lower transparent electrical contact 12. Spacers 15 are used to offset the lower transparent glass substrate 11 from the upper transparent glass substrate 18 and seals 14 and 16 are used to prevent leakage of the active material out of the cavity 20. In this particular device, the seals are made of wax paper. The inner surface of the upper transparent glass substrate 18 also contains a transparent electrical conductor 17 and electrical contact 19. The cavity contains the active material with suitable organic solvent, source of silver ions, anion and mixed opacifier.

We claim:

1. An electrodeposition display system comprising:
   (a) positive and negative electrodes;
   (b) electrolyte comprising organic solvent, silver-containing ionic species, and a mixed opacifier; in which electrical activation of the positive and negative electrodes produces an electrical action which leads to electrodeposition of a partially opaque silver species thereby altering the optical contrast of the display characterized in that the opacifier comprises a solid semiconducting substance and a solid insulator substance which are light in color and chemically compatible with the electrolyte.

2. The electrodeposition display device of claim 1 in which the semiconducting substance has a conductivity of at least $10^{-9}$ mhos/cm at room temperature.

3. The electrodeposition display device of claim 2 in which the semiconducting substance has a conductivity of at least $10^{-7}$ mhos/cm at room temperature.

4. The electrodeposition display device of claim 1 in which the opacifier comprises between 1-90 weight percent semiconductor, remainder insulator.

5. The electrodeposition display device of claim 4 in which the opacifier comprises 20–70 weight percent semiconductor, remainder insulator.

6. The electrodeposition display device of claim 5 in which the opacifier consists essentially of 30–40 weight percent semiconductor, remainder insulator.

7. The electrodeposition display device of claim 1 in which the solid semiconductor substance consists essentially of at least one doped compound selected from the group consisting of uncolored, transition metal oxides.

8. The electrodeposition display device of claim 7 in which the semiconducting substance consists essentially of at least one doped compound selected from the group consisting of $TiO_2$, $ZrO_2$, $Nb_2O_5$ and $Ta_2O_5$.

9. The electrodeposition display device of claim 7 in which the dopant concentration ranges from 0.001 to 1.0 weight percent.

10. The electrodeposition display device of claim 7 in which the solid semiconductor substance is semiconducting $TiO_2$.

11. The electrodeposition display device of claim 10 in which the dopant is iron in the concentration range of 0.005 to 0.025 weight percent.

12. The electrodeposition display device of claim 1 in which the solid insulating substance is selected from the group consisting of $BeO$, $MgO$, $ZnO$, $Al_2O_3$, $Ga_2O_3$, $Sc_2O_3$, $Y_2O_3$, $La_2O_3$, $Gd_2O_3$, $SiO_2$, $GeO_2$, $BeAl_2O_4$, $ZnGa_2O_4$, $MgAl_2O_4$, $Be_3Al_2Si_3O_{12}$, $GdAlO_3$, $NaAlSi_2O_6$ and $NaYO_2$.

13. The electrodeposition device of claim 1 in which the insulator substance consists essentially of a transition metal oxide sufficiently pure to be insulating.

14. The electrodeposition device of claim 13 in which the solid insulating substance is selected from the group consisting of $NaAlSi_2O_8$ and $Al_2O_3$.

15. The electrodeposition device of claim 1 in which the solvent has a $pK_a$ greater than 9.

16. The electrodeposition device of claim 15 in which the solvent has a $pK_a$ value greater than 12.

17. The electrodeposition device of claim 1 in which the solvent is selected from the group consisting of dimethylsulfoxide and N,N-dimethylformamide.

18. The electrodeposition display device of claim 1 in which the electrolyte comprises a silver-containing ionic species selected from the group consisting of silver iodide and silver bromide.

19. The electrodeposition device of claim 1 in which the electrolyte comprises in addition iodide containing compound selected from the group consisting of alkali metal iodides and ammonium iodide.

20. The electrodeposition display device of claim 1 in which the electrolyte comprises in addition bromide containing compound selected from the group consisting of alkali metal bromides and ammonium bromide.

* * * * *